(12) United States Patent
Ribeiro Kuramoto et al.

(10) Patent No.: US 12,392,488 B2
(45) Date of Patent: Aug. 19, 2025

(54) METHOD OF ASSESSMENT OF THE QUALITY OF THE BURN OF THE GASES IN THE FLARE AND ADJUSTMENT TO THE VAPOR FLOW RATE IN A CONTINUOUS AND CONSTANT WAY

(71) Applicants: Petróleo Brasileiro S.A.—Petrobras, Rio de Janeiro (BR); Faculdades Católicas, Rio de Janeiro (BR)

(72) Inventors: Andre Seichi Ribeiro Kuramoto, São José dos Campos (BR); André Davys Carvalho Melo De Oliveira, Rio de Janeiro (BR); Pedro Henrique Lopes Torres, Rio de Janeiro (BR); William Paulo Ducca Fernandes, Rio de Janeiro (BR); Hélio Côrtes Vieira Lopes, Rio de Janeiro (BR); Wolfgang Kosteke Schwaner, Araucária (BR); Bruno Itagyba Paravidino, Rio de Janeiro (BR); Cristiane Salgado Pereira, Rio de Janeiro (BR); Patrick Nigri Happ, Rio de Janeiro (BR); Sidney Comandulli, Araucária (BR)

(73) Assignees: Petróleo Brasileiro S.A.—Petrobras, Rio de Janeiro (BR); Faculdades Católicas, Rio de Janeiro (BR)

( * ) Notice: Subject to any disclaimer, the term of this patent is extended or adjusted under 35 U.S.C. 154(b) by 490 days.

(21) Appl. No.: 17/890,539

(22) Filed: Aug. 18, 2022

(65) Prior Publication Data

US 2023/0120460 A1    Apr. 20, 2023

(30) Foreign Application Priority Data

Oct. 14, 2021    (BR) .................... 10 2021 020663 2

(51) Int. Cl.
*F23N 5/26*    (2006.01)
*F23G 7/08*    (2006.01)
(Continued)

(52) U.S. Cl.
CPC ............... *F23N 5/265* (2013.01); *F23G 7/08* (2013.01); *F23L 7/005* (2013.01); *G06V 20/52* (2022.01);
(Continued)

(58) Field of Classification Search
CPC .... G06V 10/764; G06V 10/82; G06V 10/774; G06V 20/52; G06V 20/60; G06N 3/045;
(Continued)

(56) References Cited

U.S. PATENT DOCUMENTS

| | | |
|---|---|---|
| 3,891,847 A | 6/1975 | Schmidt et al. |
| 4,505,668 A | 3/1985 | Dibiano et al. |

(Continued)

FOREIGN PATENT DOCUMENTS

BR    1010400-3 A2    5/2013

*Primary Examiner* — Ko-Wei Lin
(74) *Attorney, Agent, or Firm* — Morrison & Foerster LLP

(57) ABSTRACT

The present invention presents a method of assessing the quality of the burning of the gases in the flare and adjusting the vapor flow rate in a continuous way and with flexibility to integrate with different instrumentation topologies of the flare control system. The state of the flare flame is identified from an image set of the flame, classifying it into one of four: flame with excess vapor, optimized flame, flame with soot or images with insufficient information to classify them as one of the previous states of the flare flame. In addition, it is further able to quantify the height of the flame. The invention comprises the following components: flare, camera, image stream manager, edge computer, data historian, alert manager, information visualization panels, distributed (Continued)

digital control system, DDCS, and cloud storage and computing.

15 Claims, 4 Drawing Sheets

(51) Int. Cl.
  *F23L 7/00* (2006.01)
  *G06V 20/52* (2022.01)
  *G06V 20/60* (2022.01)

(52) U.S. Cl.
  CPC .......... *G06V 20/60* (2022.01); *F23N 2229/20* (2020.01); *F23N 2237/22* (2020.01)

(58) Field of Classification Search
  CPC ....... G06N 3/08; F23N 2229/20; F23N 5/265; F23G 5/50
  See application file for complete search history.

(56) References Cited

U.S. PATENT DOCUMENTS

| | | | |
|---|---|---|---|
| 2008/0233523 A1 | 9/2008 | Diepenbroek et al. | |
| 2011/0085030 A1* | 4/2011 | Poe ........................ | F23G 7/085 382/103 |
| 2020/0387120 A1 | 12/2020 | Gurajapu et al. | |

* cited by examiner

METHOD OF ASSESSMENT OF THE QUALITY OF THE BURN OF THE GASES IN THE FLARE AND ADJUSTMENT TO THE VAPOR FLOW RATE IN A CONTINUOUS AND CONSTANT WAY

CROSS-REFERENCE TO RELATED APPLICATION

This application claims priority to Brazilian Application No. 10 2021 020663 2 filed on Oct. 14, 2021, and entitled "METHOD OF ASSESSMENT OF THE QUALITY OF THE BURN OF THE GASES IN THE FLARE AND ADJUSTMENT TO THE VAPOR FLOW RATE IN A CONTINUOUS AND CONSTANT WAY," the disclosure of which is incorporated herein by reference in its entirety.

FIELD OF THE INVENTION

The present invention is related to the control of the quality of the burning of gases in the flare systems of industrial units.

DESCRIPTION OF THE STATE OF THE ART

Although it is inherent to its production process, the burning of gases in the flare in an industrial unit is an operation that one seeks to minimize. This burning occurs for reasons of operational and environmental safety. To ensure this safety, industrial units, for example, for oil processing, rely on the flare system, where the quality of the burning of gases is controlled by means of adjustments in the amount of water vapor injected into the flare. Controlling the quality of the burning of gases means maintaining the burning of gases safe for the environment, minimizing greenhouse gas emissions and soot emissions and saving resources related to water production in industrial units.

The quality of the burning of the gases in the flare was visually assessed, by means of cameras of the closed-circuit television, CCTV, by operation technicians of the industrial unit. When the operation technician observed a deviation from the optimal adjustment of the burning quality of the gases, he made remote manual adjustments through the distributed digital control system, DDCS, which resulted in the alteration in the flow rate of water vapor to the flare, adapting the quality of the burning of the gases. This assessment and adjustment performed by the operation technician occurred intermittently, among the various other operational activities.

Document U.S. Pat. No. 3,891,847 discloses a method and equipment for controlling the flow of vapor from a flare tower by detecting the radiation emitted by the flare and using the resulting signal to control the flow rate.

The document U.S. Pat. No. 4,505,668 discloses a method of measuring the infrared radiation of a flare tower in order to manipulate the vapor flow rate to decrease the smoke production in the combustion of hydrocarbons.

Document P11010400-3 discloses an automatic control system that includes an optical image capture device, as part of an image generation system aiming at controlling a flame generation system through an image processing algorithm.

Document US2008/0233523 discloses a video analytic system for the characterization and control of a flare. The system allows the reduction of emissions and the adjustment of the flame through algorithms that analyze the video.

Document US2020/0387120 discloses a method and system for advanced flare analysis in a flare operation monitoring and control system that contains a data acquisition and augmentation mechanism in which data is acquired through a network of a plant, including images of flare operations from one or multiple hub cameras. An industrial self-adaptive system based on machine learning processes the images and data and assigns pixels to the images according to selected categories of smoke, flame, and flare flame vapor. The analysis results are displayed and an alert is issued when the percentage of pixels in a specific category is outside a predetermined range.

Document US2020/0387120 discloses methods and systems for monitoring a flare with a camera. The methods and systems can indicate to operators the presence or absence of smoke, flame and vapor cloud, and record these indications or measurements. In addition, the methods and systems can confirm whether there is a compliance with local regulations on visual emissions and smoke plume or not. The methods and systems automatically adjust the delivery rate of key inputs, including measures to assist fuel gas, purge gas, vapor and/or air simultaneously to maintain or achieve the compliance with said local regulatory requirements. In addition, there are methods for a process of machine learning to use controller inputs to identify normal and abnormal flare states and provide visual indications and recommendations for flare operation.

The inventions described in the previously presented documents differ from this one for not acting in the flare system in a continuous way and integrated to the control system of injection of water vapor in the flare system. Additionally, this invention is distinguished by using deep learning techniques to, in addition to being able to detect the flare flame states, detect the negative state, that is, known scenarios with insufficient information to classify them as one of the flare flame states.

In view of the difficulties present in the abovementioned state of the art, and for solutions to assess the quality of the burning of gases in the flare and adjust the vapor flow rate in a continuous and constant way, the need arises to develop a technology capable of operating in an effective way and that complies with environmental and safety guidelines. The abovementioned state of the art does not have the unique characteristics that will be presented in detail below.

OBJECTIVE OF THE INVENTION

It is an objective of the invention to establish a method capable of assessing the quality of the burning of gases in the flare system and continuously adjusting the vapor flow rate, not depending on the operation technician to be continuously dedicated to this activity.

It is further an objective of the invention to alert the operation technician through alerts on the operational panel of the industrial unit to the non-optimized condition of the burning of gases in the flare.

It is further an objective of the invention to automatically increase the time of complete burning of the gases sent to the flare, reducing the emission of soot and unburned gases to the environment, minimizing the emissions of greenhouse gases.

It is further an objective of the invention to optimize the conversion of gases into $CO_2$ minimizing the generation of odor in the community environment.

It is further an objective of the invention the rational use of water vapor injected into the flare, saving resources related to water production in the industrial units and minimizing the generation of ambient noise.

BRIEF DESCRIPTION OF THE INVENTION

The present invention presents a method that allows the assessment of the quality of the burning of gases in the flare and adjustment of the water vapor flow rate in a continuous, automated and integrated way to the control system of water vapor injection in the flare system. The invention identifies, from an image set of the flare flame, the quality of the burn, classifying it in one of four states: flame with excess vapor, optimized flame, flame with soot and images with insufficient information to identify the burning quality. Additionally, the height of the flame is quantified, which helps in the discernment of states.

The method of assessing the quality of the burning of gases in the flare and adjusting the vapor flow rate in a continuous and constant way, is characterized in that it comprises the following components: flare, camera, image stream manager, edge computer, data historian, alert manager, information visualization panels, digital distributed control system, DDCS, and cloud storage and computing.

BRIEF DESCRIPTION OF DRAWINGS

The present invention will be described in more detail below, with reference to the attached figures which, in a schematic form of and not limiting the inventive scope, represent examples of this invention. In the drawings, there are.

DETAILED DESCRIPTION OF THE INVENTION

Figure 1:
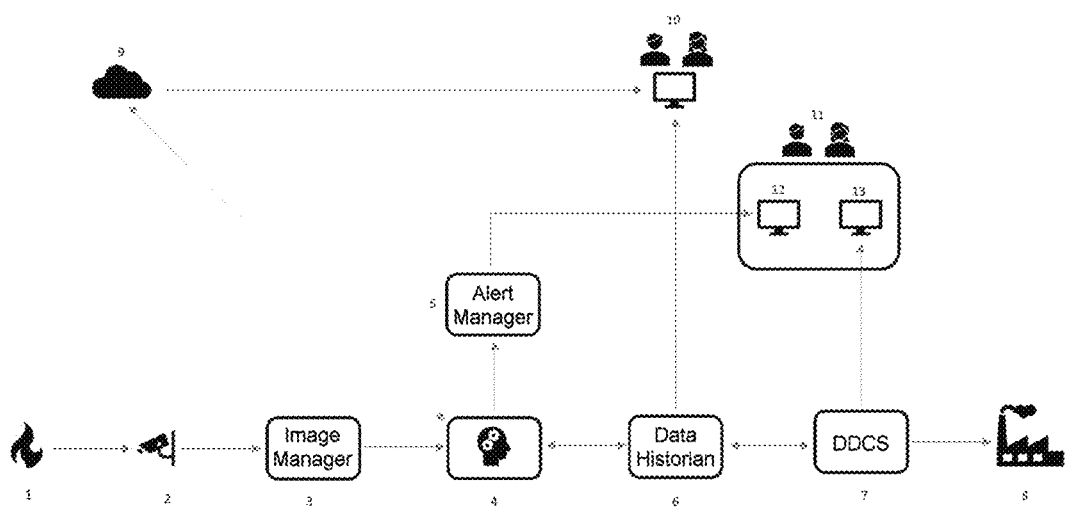
FIG. 1 illustrates components of the assessment method and their interconnections, with the respective legend: (1) flare; (2) visible camera; (3) image stream manager; (4) edge computer, that is, a computer server where there are executed models of artificial intelligence, AI, flame classification (flame state) and its height; (5) alert manager; (6) data historian; (7) DDCS; (8) water vapor injected into the flare; (9) cloud storage and computing, that is, where the image sets (data) are stored for training and testing the AI model, the computational resources are allocated for training the AI model, among other services for integrating components of the invention; (10) information visualization panels of the invention; (11) integrated control center of the industrial unit, where the operation technicians, who monitor the alerts, are located (12), and the unit process variables (13).

There follows below a detailed description of a preferred embodiment of the present invention, by way of example and in no way limiting. Nevertheless, there will be clear to a technician skilled on the subject, from reading this description, the possible additional embodiments of the present invention further comprised by the essential and optional features below.

Upon applying deep learning techniques and computer vision, the assessment method processes the images of the flame continuously, identifying the state and its height, and acts automatically and in an integrated way in the water vapor flow rate control system, through the DDCS. The identification (inference) of the flame state is performed through a deep learning model (artificial intelligence, AI). The visible characteristics such as the shape and color of the flame on the flare are constantly changing due to variations in the flow rate and composition of the gas and variations in the environment, for example, winds and the presence of clouds. Then, one must consider an image set in sequence to obtain the flame state. Heuristics were used to combine the classifications and quantifications of the flame height obtained from each image in the sequence and, thus, obtain an assertive classification for the set of processed images. This image set classification is used by the control system of refinery processes. From the classification, the control system changes the relation between water vapor flow rate and gas flow rate, in order to minimize vapor consumption without generating soot in the flame. This process maintains the burning safe for the environment, minimizes greenhouse gas emissions, and saves resources used to produce water vapor.

The model generated through deep learning was obtained, in brief, from the following steps:
- collection of images containing the flames of the flare (flare);
- annotation of these images in one of the four states (flame with excess vapor, optimized flame, flame with soot and images with insufficient information to identify the quality of the burn);
- division of the annotated images into the training and testing group;
- model training using a commercial software (group of training images), making use of deep learning and computer vision techniques; and
- assessment of the effectiveness of the AI model, based on the images of the test group.

In short, machine learning is any approach that employs algorithms to find patterns from data. The algorithm performs the function defined by the engineer or programmer, and analyzes the data to provide an answer. Deep learning works similarly to the first learning; however, it uses a larger amount of data and makes use of structures with more sophisticated transformations and parameters than traditional artificial neural networks.

The invention comprises the following components: flare, camera, image stream manager, edge computer, data historian, alert manager, information visualization panels, distributed digital control system, DDCS, and storage and computing in cloud. There follows a description of each of these components.

The flare is that one of the components of the operational safety system of an industrial unit, called the flare system.

The visible or thermographic spectrum camera is in a suitable position to continuously capture images of the flare flame. The camera has lenses and sensors capable of presenting the image of the flame with sufficient sharpness and brightness to discern colorations of the flame and smoke emitted.

The image stream manager is a computerized system capable of performing digital treatments and providing digital images through data streams using the Real Time Streaming Protocol (RTSP). One of the data streams is configured for a resolution of 640×480 pixels and a refresh rate of at least 1 FPS (frame per second). The image stream manager is connected to a computer network with the ability to establish a RTSP data stream at least at the mentioned resolution and refresh rate.

The edge computer is a computing resource hosted in the domain of the industrial unit with an installed application capable of performing 4 activities:

1. Consuming sets of a few dozen images from the image stream manager through the previously mentioned RTSP data stream, and processing them identifying the state of the flare flame and quantifying its height. There are 4 possible flare flame states: flame with soot, flame with excess vapor, optimized flame or image with insufficient information to identify the quality of the burn. This last class refers to the result of image processing not being assertive about the state of the flame. The amount of images in the image set is a configuration parameter of the present invention. The class identification occurs through a deep learning model (artificial intelligence) applied to each of the images in the set. The result of the class inference obtained from each image in the set is combined using heuristics to obtain the class that best represents the entire image set. The flame height is also used in the heuristics and it is inferred through computer vision techniques.
2. Sending messages to the alert manager so that the identified state of the flame is recorded as an alert event with visibility for the group of users who operate the flare system at the industrial unit. Thus, users receive on the operational screen of the CCTV system the updated state of the flare flame. The alert is sent after the processing of each image set is completed.
3. Sending to the data historian the following data resulting from the processing of the image set: identified state of the flare, number of images processed in the set, amount of images classified in each class (state), result, accuracy of the individual processing of each image, etc. The sending of the data to the historian is performed after the completion of the processing of each image set.
4. Sending to the cloud storage and computing resource the data that are also sent to the historian, in addition to processed image samples from the image set. Sending data and image samples to the cloud storage and computing resource is performed after each image set has been processed.

The information visualization panels present operating data of the invention. All information sent by the edge computer to the cloud and to the data historian are presented in graphs, images and tables. Additionally, there are presented operation information of the control system of the ratio of water vapor flow rate and gas flow rate of the flare, which is available in the data historian. The information is presented in a format suitable for the management and maintenance of the method.

Figure 4:
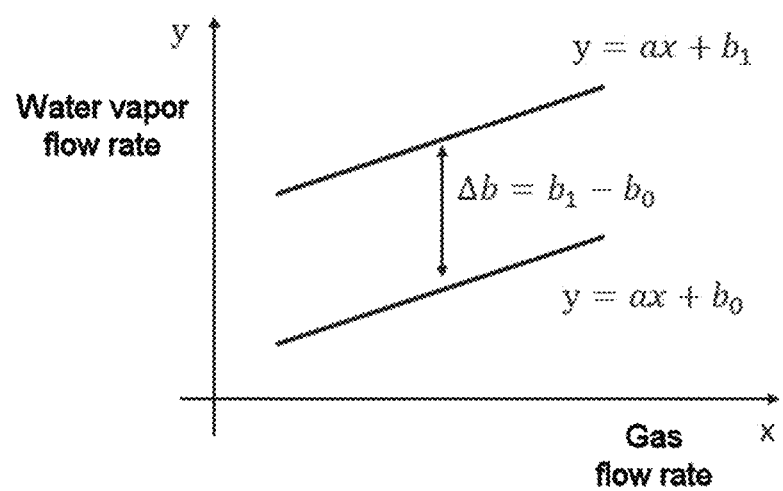
FIG. 4 illustrates a schematic of the ratio curve of water vapor flow rate and gas flow rate. From the classification of one of the 4 states of the flare flame, the regulatory control of the flare system adjusts the vapor flow rate acting on the independent coefficient (b, bias) of this curve.

The distributed digital control system DDCS consumes the results sent by the edge computer from the data historian, and acts on the physical system of vapor valves of the refinery flare system. The actuation occurs in the sense of minimizing the amount of vapor to the flare without causing the emission of soot. There are three actuation options, depending on the availability of the instrumentation of the flare control system:

1. Acting on the independent coefficient (b, bias) of the ratio curve of water vapor flow rate and gas flow rate of the regulatory control of the flare system (FIG. 4).
2. Acting on the setpoint of the regulatory controller of the vapor flow rate of the flare system.
3. Acting on the position of the valve of regulatory control of vapor flow rate of the flare system.

The cloud storage and computing bring a set of features to the:

1. Training of the artificial intelligence model to be used in the edge computer to infer the flame states.
2. Annotation of new images to compose the training and testing databases of the model.
3. Databases to store edge computer processing information and samples of processed images. This bank serves the information visualization panels and the process of annotating new images to compose the analysis, training and testing databases of the image classification model (processing).

The edge computer consumes image sets from flame through the image stream manager. The image processing on the edge computer identifies, for each image in the set, the state of the flame (flame with soot, flame with excess vapor, optimized flame) or reports that there is not sufficient information in the image to identify the quality of the burn. The processing also quantifies the flame height for each image in the set. The flame states identified for each image in the set, the confidence of each inference, the quantification of the flame height and other statistics (total amount of processed images, number of identified images of each class) are used to obtain the class that represents the image set. All this information is sent to the:

1. Alert manager as an event record visible for operation team of the flare system to know the flame state estimated by the assessment method.
2. Data historian.
3. Cloud storage and computing in order to improve the model (retraining) and presentation of information in the information visualization panels. Additionally, samples of processed images are sent.

The control system of the flare system consumes the identified state associated with the other statistics of the image set processing from the data historian. This system acts according to the three options mentioned previously, depending on the availability of instrumentation of the flare system. The action occurs in order to minimize the vapor flow rate to the flare, without causing the emission of soot.

All the management and maintenance information of the assessment method is available in information visualization panels.

In cloud storage and computing there are resources for annotating images and retraining the processing model (classification) of the images. Information from image processing and the processed image samples make up the image sets (data) for training and testing the AI model.

Figure 2:
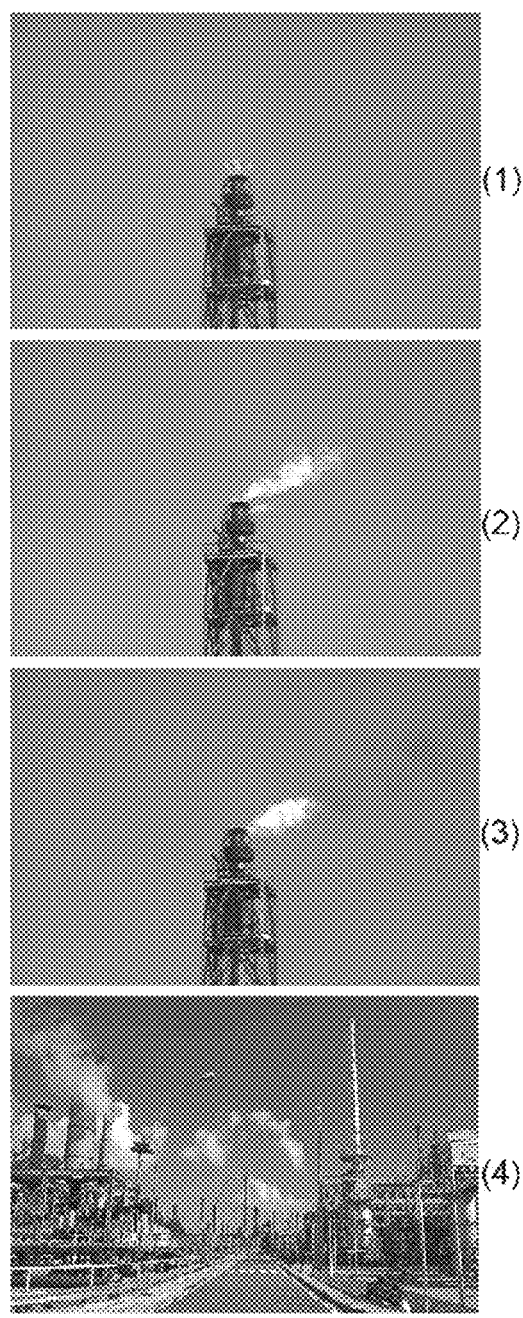
FIG. 2 illustrates classes: (1) flame with excess vapor; (2) optimized flame; (3) flame with soot; and (4) example image with insufficient information to identify the quality of the burn.

The AI model aims at identifying (inference) the flame state of the flare from an image of the flame, classifying it into one of four states (classes): flame with excess vapor, optimized flame, flame with soot or negative state, that is, known scenarios with insufficient information to classify the same as one of the flare flame states. In FIG. 2, the flame states are exemplified, which gave rise to the names of the classes used in the AI model.

A cloud computing resource is used to annotate the images and train the Artificial Intelligence model. The images are obtained through videos recorded continuously by the CCTV system. The videos are sampled generating images to be used for training the model. The images are divided into training and testing datasets of the model. The training dataset is used to train the model. The test dataset is used to assess the performance of the model. The calculation of model performance is carried out by the cloud computing using the trained model and the test dataset.

The cloud storage is also used to historically store the image samples and metadata generated by the AI model running on the real-time edge computer. The images classified on the edge computer with lower confidence are highlighted for an expert to analyze these scenarios and, if applicable, propose a new annotation and perform the AI model retraining. The retraining basically follows the same steps described in the training; however, there is an assessment if the model obtained from the retraining is better than the previous one. If this is confirmed, the AI-based models are automatically replaced.

Environmental conditions are a factor of special attention when creating training and testing datasets. For example, wind, in addition to modifying the size and direction of the flare flame, can make it difficult to identify soot. The background of the image also has to be taken into account for the model to perform well in adverse conditions.

Figure 3:
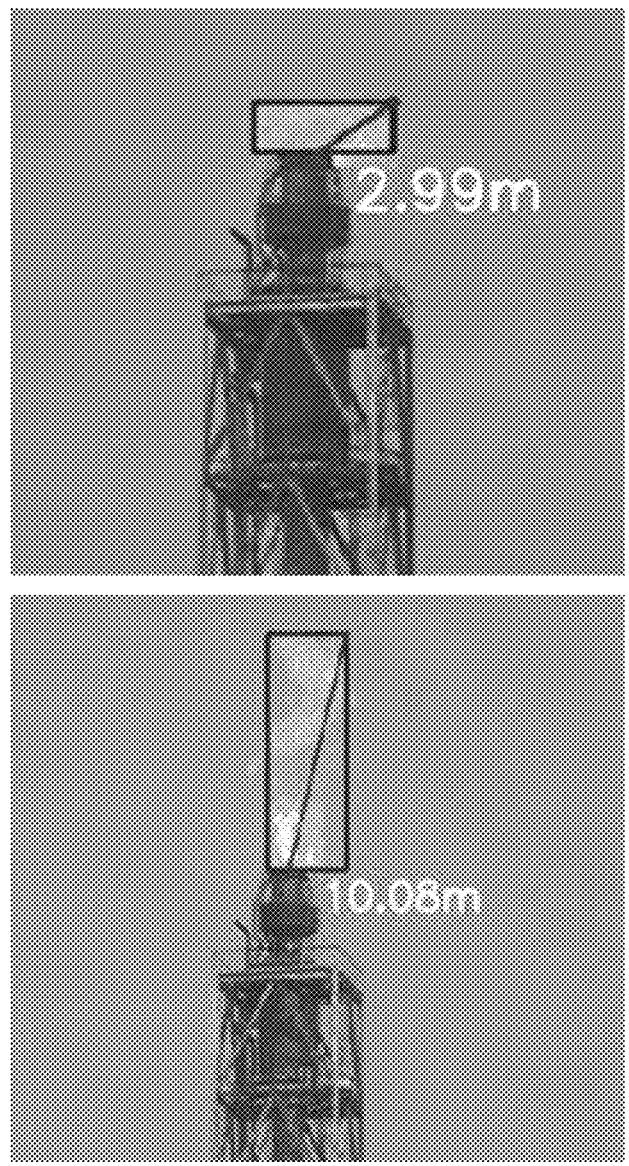
FIG. 3 illustrates the identification of the height of the flare flame, where the inventive method approximately quantifies and records in the images the heights of 2.99 meters and 10.08 meters, respectively. The height is calculated from the conversion to meter of the number of pixels quantified on the straight line drawn inside the rectangle (see figure). To quantify how many meters there are in a pixel, the engineering drawing of the flare structure was used as a reference.

To quantify the height of the flame, computer vision techniques are used. A filter is applied to each image with a color interval defined in the HSV (Hue, Saturation and Value) color system. Only the characteristic colors of the flare flame are filtered. Next, the flame edges are detected using the Canny Edge algorithm creating the flame contour region. A rectangular contour line (bounding box) is constructed containing the entire area of the flame, FIG. 3. To be able to determine the height of the flare under different conditions, the point of the bounding box that is farthest is determined and, with that, this distance is taken as a reference to infer the height of the flare.

The invention claimed is:

1. A method of assessment of the quality of the burn of gases in a flare system and adjustment to water vapor flow rate in a continuous and constant way, the method comprising:
   a. obtaining a flare flame image set comprising images;
   b. using computer vision techniques, quantifying a flare flame height of each of the images;
   c. using a deep learning model, classifying the images into four states: flame with excess vapor, optimized flame, flame with soot and images with insufficient information;
   d. combining the quantification of step "b" with the results of step "c" to classify the image set, obtained in step "a", in one of the four states of the flare flame;
   e. using retraining of an image classification model;
   f. adjusting the water vapor flow rate in a continuous, automated and integrated way to the water vapor injection control system in the flare system, by means of the information obtained in steps "a", "b", "c" and "e";
   g. employing the following components: flare, camera, image stream manager, edge computer, data historian, alert manager, information visualization panels, distributed digital control system (DDCS), and cloud storage and computing.

2. The method according to claim 1, wherein the image stream manager is a computerized system capable of performing digital treatments and providing digital images through data streams using the Real Time Streaming Protocol (RTSP).

3. The method according to claim 2, wherein one of the data streams is configured for a resolution of 640×480 pixels and a refresh rate of at least 1 FPS (frame per second).

4. The method according to claim 1, further comprising connecting the flare system to a computer network capable of establishing a Real Time Streaming Protocol data stream.

5. The method according to claim 1, wherein the edge computer is a virtualized computing resource in containers on-premises environment, having an operating system capable of performing 4 activities:
   a) Consuming image sets (at least 40 images) from the image stream manager through a Real Time Streaming Protocol data stream and processing the image sets to identify (inference) the state of the flare flame and the dimension (size or height) of the flame;
   b) Sending commands to the alert manager so that the identified state of the flame is recorded as an event with visibility for the group of users who operate the flare system at the industrial unit;
   c) Sending to the data historian the following data resulting from the processing of the image set: identified state of the flare, amount of images processed in the set, amount of images classified in each class (state), accuracy of the individual processing of each image;
   d) Sending to the cloud storage and computing the data that is also sent to the data historian, in addition to processed image samples from the image set.

6. The method according to claim 5, wherein an AI model classifies the 4 possible states (or classes) of the flare flame: flame with soot, flame with excess vapor, optimized flame or image with insufficient information to identify the burning quality.

7. The method according to claim 1, wherein the control system consumes from the data historian the data sent by the edge computer to act on the physical vapor valve system of the flare system of the industrial unit.

8. The method according to claim 7, wherein the control system acts in 3 ways:
   a) Acting in an adjustment of bias of a regulatory control of vapor/gas ratio of the flare system;
   b) Acting on a setpoint of a regulatory control of vapor flow rate of the flare system;
   c) Acting on the position of a valve of regulatory control of the vapor flow rate of the flare system.

9. The method according to claim 1, wherein the cloud and storage computing brings the following resources:
   a) Training of an artificial intelligence model to be used in the edge computer;
   b) Annotation of new images to compose the training and testing databases of the artificial intelligence model;
   c) Databases to store edge computer processing information and samples of processed images.

10. The method according to claim 1, wherein management and maintenance information are available on information visualization panels.

11. The method according to claim 1, further comprising using deep learning technique to build a classification model of the flare flame states.

12. The method according to claim 1, further comprising quantifying the height of the flame through classic computer vision, creating a mask of a range of colors of the HSV (Hue Saturation Value) channel, and filtering only the characteristic colors of the flare.

13. The method according to claim 12, further comprising determining the points of interest using an algorithm to detect edges.

14. The method according to claim 12, characterized in that it further comprising drawing a rectangular contour line the entire area of the flare.

15. The method according to claim 14, further comprising determining the height of the flame is determined by measuring a distance between a burner base of the flame system and a point of the rectangular contour line that is farthest away from the burner base, wherein the flame burns out of the burner base.

\* \* \* \* \*